United States Patent [19]

Wing

[11] 4,033,045

[45] July 5, 1977

[54] PORTABLE SURVEYING GYROCOMPASS APPARATUS

[75] Inventor: Willis G. Wing, Glen Head, N.Y.

[73] Assignee: Sperry Rand Corporation, New York, N.Y.

[22] Filed: Oct. 14, 1975

[21] Appl. No.: 621,907

[52] U.S. Cl. .................. 33/275 G; 33/267; 33/326; 33/377
[51] Int. Cl.² ............ G01C 19/38; G01C 1/02
[58] Field of Search ............ 33/267, 275 G, 326, 33/327 R, 327 B, 333, 345

[56] References Cited

UNITED STATES PATENTS

| 1,589,039 | 6/1926  | Kaempfe      | 33/327   |
| 2,734,269 | 2/1956  | Claret       | 33/1 PT  |
| 3,162,951 | 12/1964 | Hintze et al.| 33/327   |
| 3,172,213 | 3/1965  | Eklund       | 33/327   |
| 3,419,967 | 1/1969  | Rocks et al. | 33/327   |
| 3,706,137 | 12/1972 | Wu et al.    | 33/327   |
| 3,758,952 | 9/1973  | Fischel      | 33/275 G |

FOREIGN PATENTS OR APPLICATIONS

| 1,251,996 | 12/1960 | France  | 33/275 G |
| 1,143,036 | 1/1963  | Germany | 33/327   |
| 187,328   | 11/1966 | U.S.S.R.| 33/267   |

*Primary Examiner*—Richard E. Aegerter
*Assistant Examiner*—Richard R. Stearns
*Attorney, Agent, or Firm*—Howard P. Terry

[57] ABSTRACT

A miniature automatically self-aligning azimuth reference employs a floated pendulous gyrocompass device for the rapid determination of geographic north as required for surveying purposes. Fast alignment with north from an initially misaligned condition is effected in an iterative manner through the action of a unitary vertical-axis magnetic centering-torquer-pick off system employing eddy current forces.

32 Claims, 14 Drawing Figures

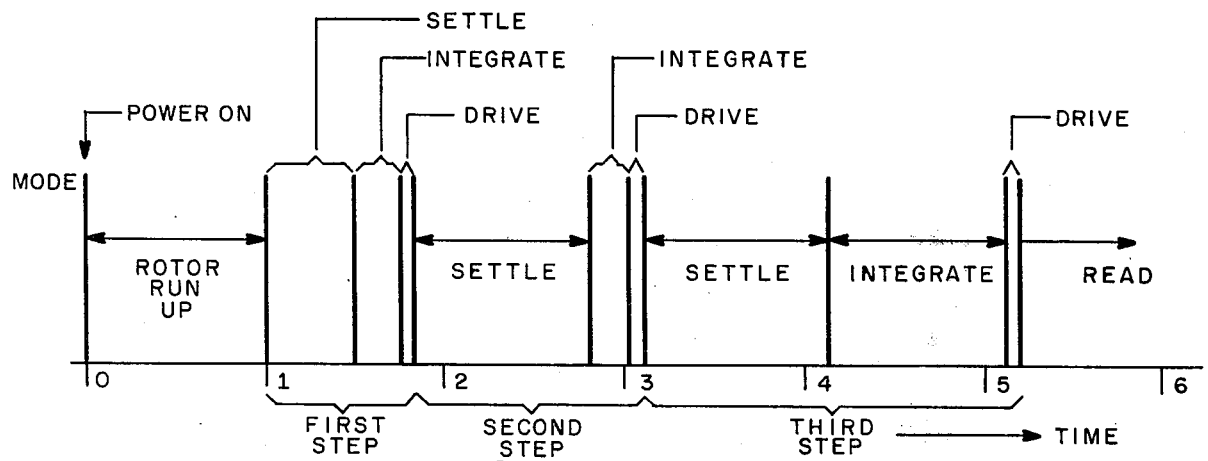
FIG. 11.
| MODE | SWITCH POSITIONS | | |
|---|---|---|---|
| | S1 | S2 | S3 |
| ROTOR RUN UP | TERM, 233 | CLOSED | OPEN |
| SETTLE | TERM, 233 | CLOSED | OPEN |
| INTEGRATE | TERM, 233 | CLOSED THEN OPEN | OPEN |
| DRIVE | TERM, 234 | OPEN | CLOSED |
| READ | TERM, 233 | CLOSED | OPEN |
FIG. 12.
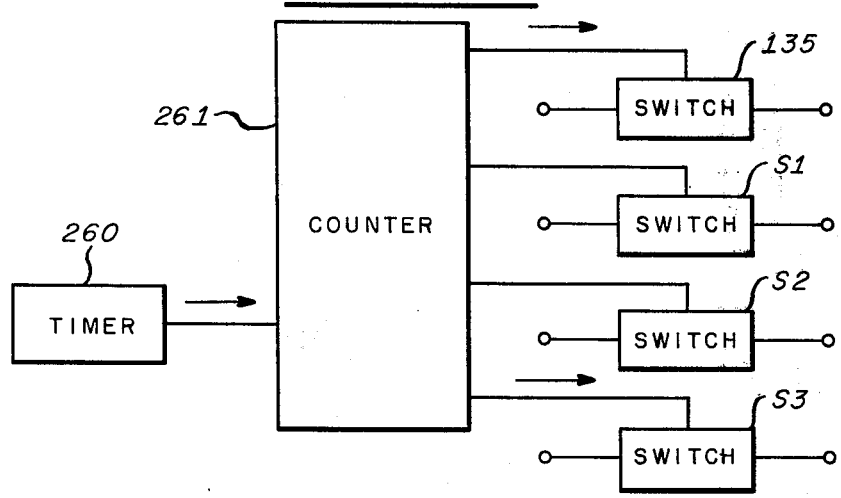
FIG. 13.
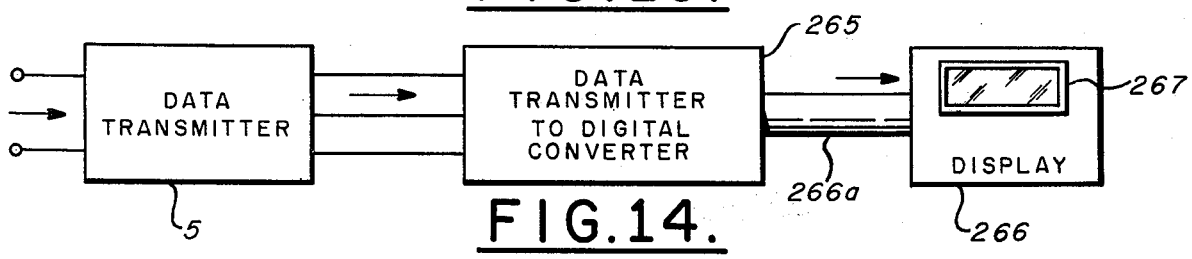
FIG. 14.

PORTABLE SURVEYING GYROCOMPASS APPARATUS

BACKGROUND OF THE INVENTION

1. Field of the Invention

The invention relates to portable gyroscopic compass devices of the kind adapted for surveying purposes and more particularly relates to portable gyrocompass surveying devices including means for rapidly aligning the reference device with respect to geographic north.

2. Description of the Prior Art

The accuracy of any gyrocompass in seeking north is primarily determined by how well torques about its vertical axis are minimized. In practice, this has resulted in the past in concepts that attempt to minimize friction in the vertical axis support system by carrying some or all of the weight of the sensitive element along this axis on a small suspension wire or tape. As a consequence, a follow-up servo is required to minimize twisting in the supporting wire, since any twist produces undesirable elastic restraint torques. These techniques have proven to be successful in producing accurate gyrocompasses for marine navigation purposes; however, their implementation involves considerable complexity. Furthermore, they do not eliminate the error torques produced either by slip rings or by wire harnesses required to transmit electrical power to the sensitive element and therefore lack full suitability for use in surveying compasses.

The typical pendulous navigation gyrocompass requires a considerable time to settle on a meridian; one hour is not unusual. To decrease in significant degree the settling time only by varying the gyro-pendulum parameters, the concept selected must either reduce angular momentum of the instrument or increase the pendulosity of the sensitive element. Neither of these alternatives is fully satisfactory. Either one results in increased error from external vibration; decreasing the angular momentum results in a less accurate unit for a given torque about the vertical axis. Other techniques devised for fast settling also suffer from these and other fundamental disadvantages.

In the use of gyrocompass apparatus for land and other surveying purposes, it is often imperative that a portable gyrocompass reference be set up easily and that is provide useful data in a very short time period. While the one hour time that might be required to put a navigation gyrocompass into reliable indicating condition on a commercial marine vessel may be tolerated since the compass, once started, normally remains in continuous operation during the voyage, such extreme times are never acceptable in surveying instruments.

A recent attempt to overcome the aforementioned problems is reflected in the E. S. Rocks et al U.S. Pat. No. 3,419,967, issued Jan. 7, 1969 and assigned to the Sperry Rand Corporation. In this concept, considerable improvement in freedom and accuracy of operation was achieved by floating the sensitive instrument in neutral buoyancy in a binnacle with the sensitive element only partly immersed in the floatation fluid. The problem of undesired restraining torques during operation of the apparatus was further reduced by placing the rotor-driving battery within the sensitive float itself. This instrument was found to be relatively inexpensive and to be acceptable in certain surveying applications where a moderate settling rate was acceptable, but to have certain limitations now overcome by the present invention. However, when the Rocks et al device is designed to have pendulosity low enough to demonstrate high immunity to vibration, the time required to settle on north was found to be as long as ten times the settling time of the present invention. Additionally, it was experimentally observed that when fluid damping was adjusted for permitting a good settling time, a high sensitivity to tripod motion was demonstrated. Placing the battery in the floated element makes servicing difficult and yields a poor momentum-to-weight ratio. Furthermore, reading out of the azimuth angle requires the operator to auto-collimate with respect to a mirror surface on the floated assembly.

SUMMARY OF THE INVENTION

It is the objective of the present invention to provide a miniature automatically self-aligning azimuth reference that employs a floated pendulous gyrocompass device for the rapid determination of geographic north and which overcomes the difficulties of prior art apparatus proposed for surveying purposes. Fast alignment with north from an initially misaligned condition is effected in an iterative manner by a unitary vertical-axis magnetic centering-torquer-pick off system advantageously employing eddy current forces. The unitary centering-torquer-pick off device cooperates with a dual servo loop control for the rapid orientation of the system. Radial centering is accomplished by using eddy current repulsion coils, resulting in frictionless centering of the sensitive element. A vertical axis torquer is provided which is also of the eddy current repulsion type; it uses the same coils as those which center the floated sensitive element along one horizontal axis. The vertical axis rotational pick off is also of the eddy current type; it uses the same coils as those which center the floated sensitive element along the second horizontal axis. Thus, great economy of parts is achieved.

The floated sensitive element is pendulous; pendulosity permits the azimuth motion of the float to be controlled using the vertical axis torquer rather than by requiring a horizontal axis torquer. The torque supplied by the vertical axis torquer is proportional to the rate of rotation of the floated sensitive element about the horizontal axis normal to the spin axis; thus, under the condition that there is no rotation of the sensitive element about this axis with respect to the vertical, this torque is a measure of the spin axis angle departure from the north and is used in the determination of the drive angle required to reduce the north pointing error. The combination of novel elements is enclosed in a follow-up housing which is servo driven about the vertical axis. The follow-up housing is successively driven in azimuth during the north-finding operation so as to become the reference for the measurement of bearing angles with respect to geographical north.

The floatation liquid is made electrically conductive for providing means for supplying electrical power to the gyroscope rotor drive motor. Accordingly, it is seen that the invention retains important advantages of the prior art while offering significant additional advantages, the ivention retaining the advantages of total absence of mechanical or electrical connections to the floated sensitive element for providing high accuracy and floatation in a free surface liquid in a self-compensating arrangement requiring no temperature or related controls. Settling on geographic north is greatly improved as to accuracy and the time required to achieve settling. Only a crude initial north alignment is required, and local latitude does not have to be precisely known. Because the basic operation of the system is automatic, the operator needs little skill and can be trained in a short time to achieve accurate results.

It will be appreciated that the instrument may be employed in a variety of surveying applications. For example, in addition to being operated in cooperation with a conventional surveying telescope or a theodolite, it may be used with optical or other range finders and the like.

BRIEF DESCRIPTION OF THE DRAWINGS

FIG. 11 is a timing chart and FIG. 12 is a table useful in explaining the programmed operation of the apparatus of FIG. 10.

FIG. 13 is a wiring diagram of a switching timer arrangement for controlling switches of FIG. 10 according to the program illustrated in FIGS. 11 and 12.

FIG. 14 is a wiring diagram of apparatus for the operation of the display of FIG. 1.

DESCRIPTION OF THE PREFERRED EMBODIMENTS

GENERAL

Figure 1:
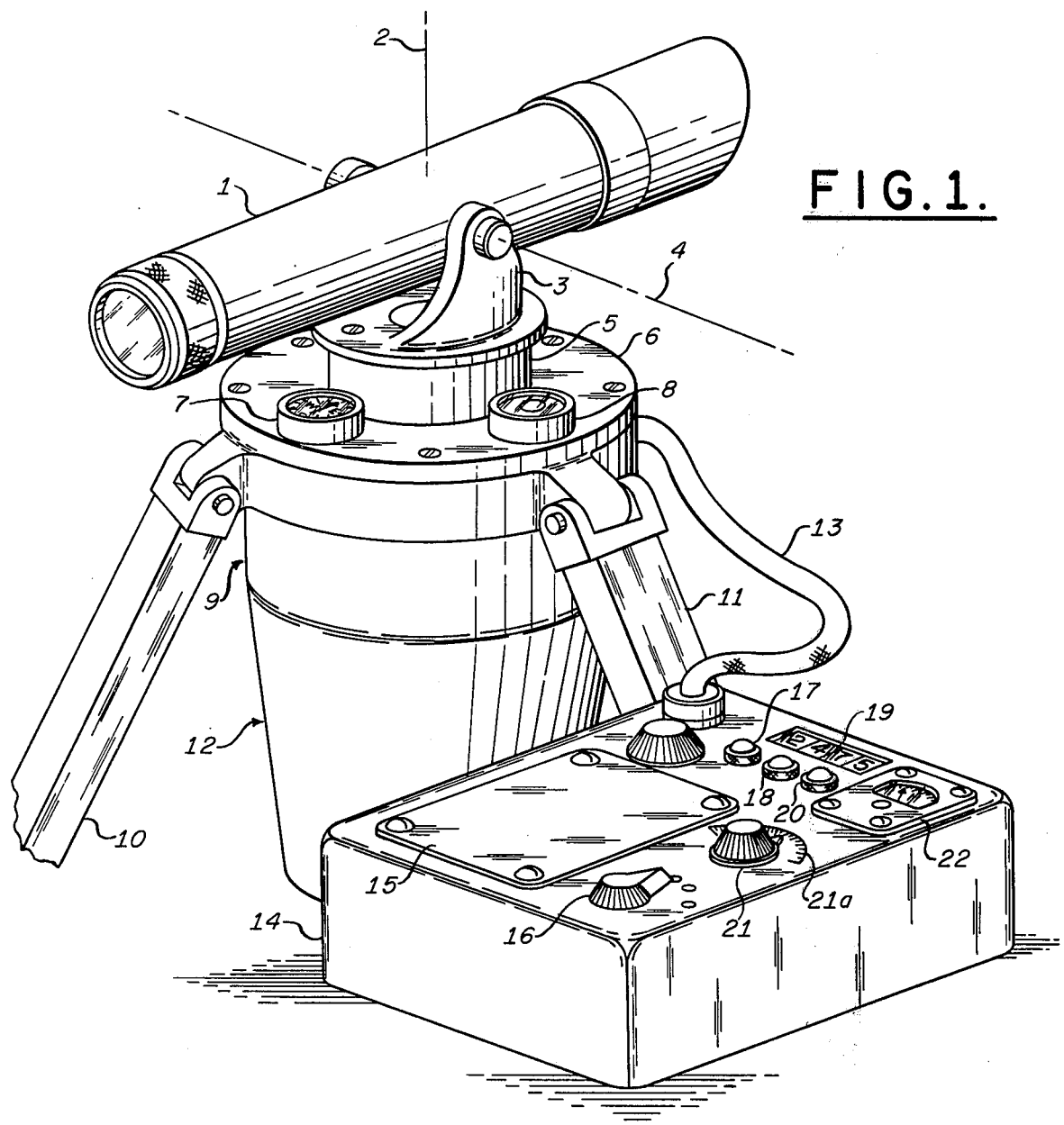
FIG. 1 is a perspective view of the apparatus of the invention as it is employed in the field.

FIG. 1 illustrates one form of the novel apparatus showing its general appearance when set up for use in the field. It is seen that the invention includes a conventional telescope 1 or other sighting or surveying device. In the illustration, the telescope 1 is journaled so that it may be pivoted about a generally horizontal axis 4 and about a generally vertical axis 2, the telescope being mounted in a pair of opposed supports 3, 3 seen more completely in FIG. 2. The supports 3, 3 are affixed to a top portion of a data transmitter section 5 which remains to be discussed particularly with respect to FIG. 2. The data transmitter section 5 is supported about a circular mounting plate 6 to which adjustable length, adjustable angle tripod legs, such as legs 10 and 11, are attached in the conventional manner often used in ordinary surveying instruments. Suspended from the mounting plate 6 is a control section 9 having, in its interior, control elements of the invention shown in more detail particularly in FIG. 2. Pending from the casing of control section 9 is a continuation thereof indicated at 12, section 12 including certain novel gyroscopic apparatus further to be discussed in connection with FIG. 3.

Control of the apparatus and display of data generated thereby are supplied mainly by the operator's control chassis 14. Generally, the apparatus will be battery operated, so that the chassis 14 is equipped with an access door 15 so that batteries may be supplied and replaced. A mode switch determining operation of the apparatus is provided at 16, this switch permitting at the will of the operator actuation of the apparatus, charging of internal batteries, or operation from the internal batteries or from an external power source. The condition of the internal battery may be indicated on a conventional electrical meter 22. Local latitude is set into the apparatus manually by use of potentiometer 21 and index 21a, as will be explained. Several situation display lights may be provided, light 17 indicating that the apparatus has been turned on, light 18 indicating that it is ready for actual use, and light 20 providing malfunction or misalignment indications, if desired. After an appropriate time interval, the desired azimuth reading is provided by the numerical display 19. Additionally, the circular mounting plate 6 of the instrument is provided with a bubble level 8 for enabling the operator initially to level plate 6 by adjustment of tripod legs 10, 11 in the usual manner and with a simple magnet compass 7 for initial rough alignment of the instrument with respect to north.

As will be explained, certain signals generated within the sections 5, 9, and 12 of the apparatus of FIG. 1 are supplied by a multi-lead electrical cable 13 to the chassis 14. Other signals and operating power may be supplied through the same cable 13 from chassis 14 to the gyroscopic surveying instrument.

THE DATA TRANSMITTER SECTION

Figure 2:
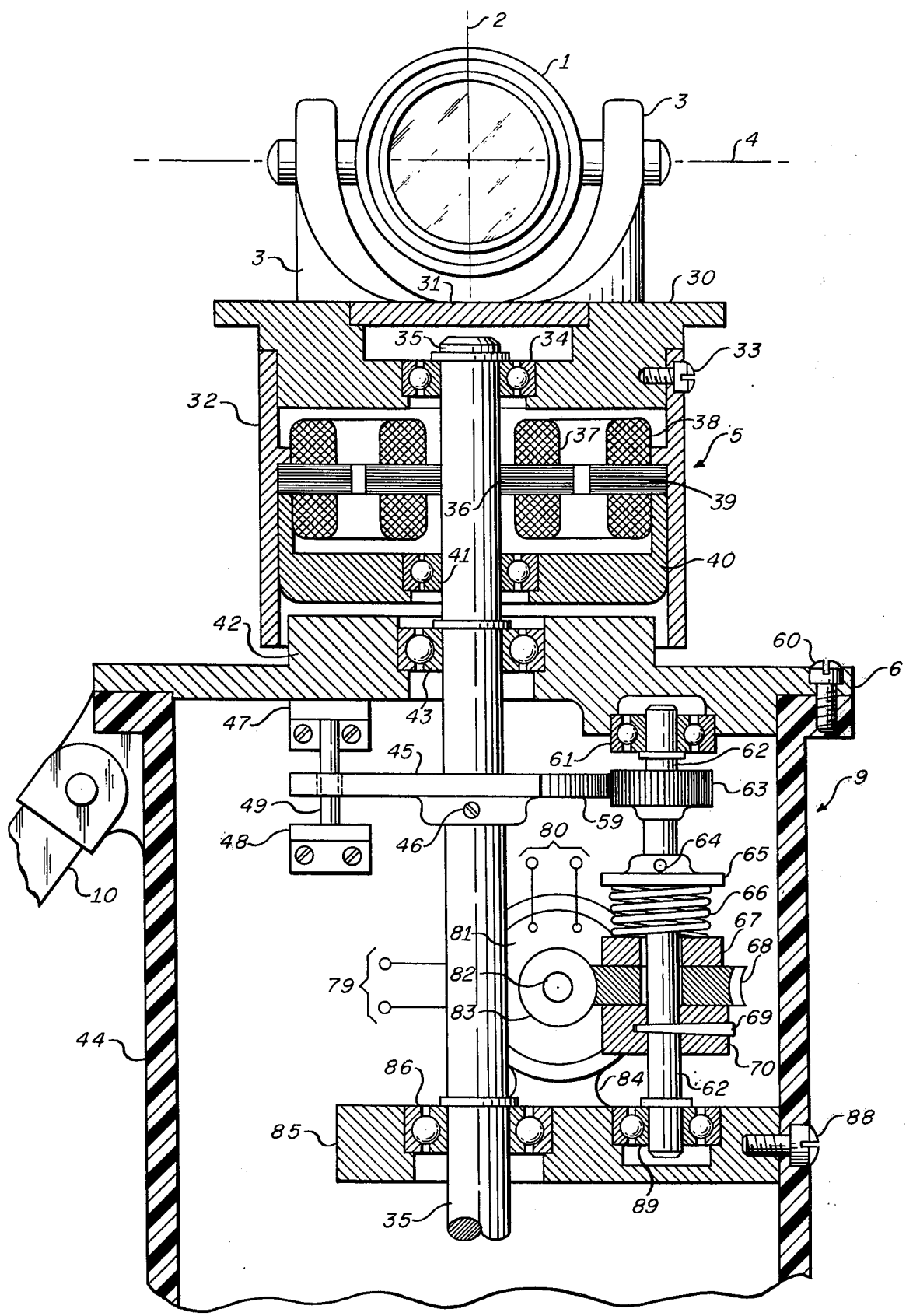
FIG. 2 is an elevation view in partial cross section of telescope, data transmitter, and control sections of FIG. 1.
Figure 3:
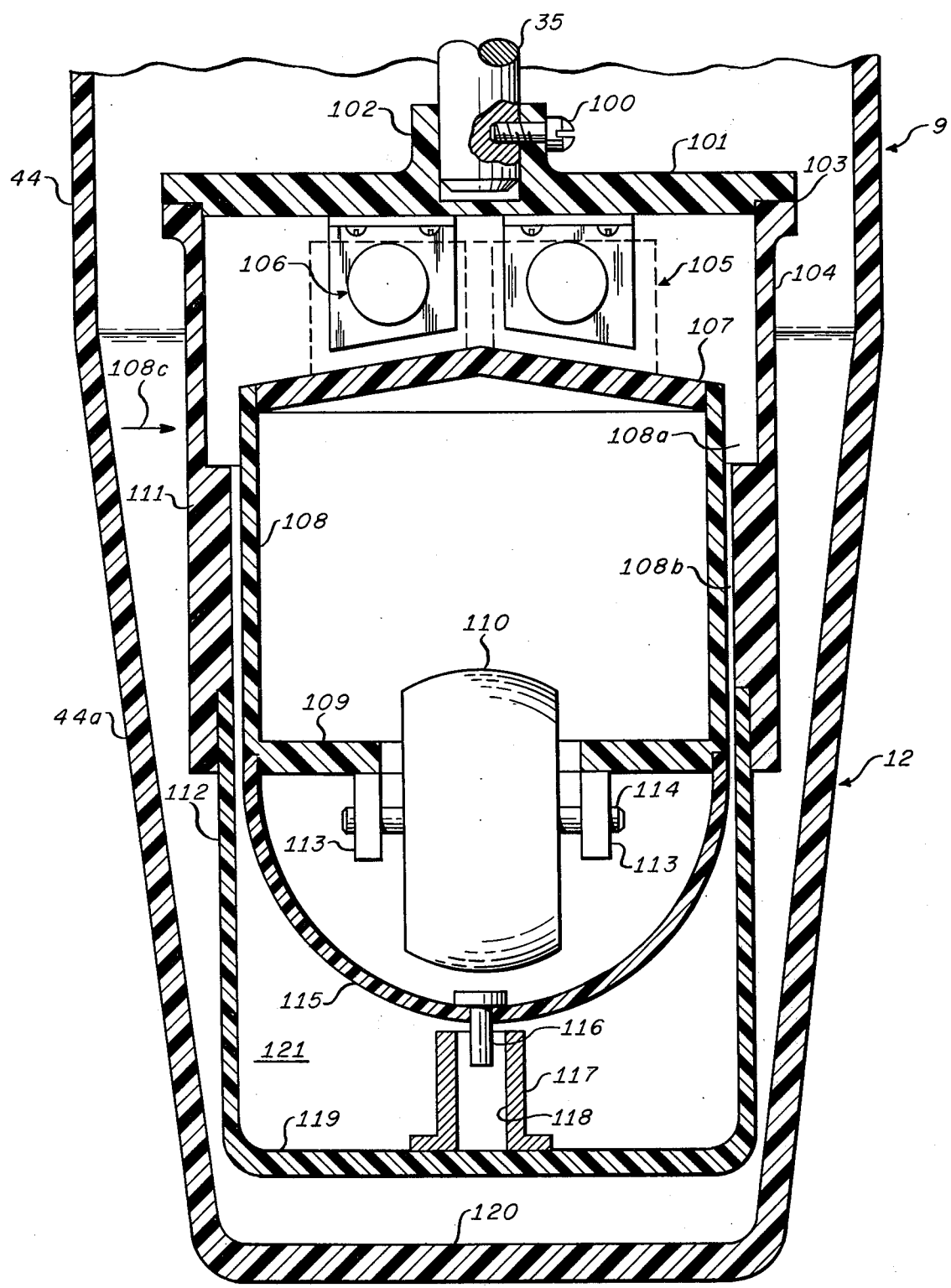
FIG. 3 is an elevation view in partial cross section of the gyrocompass section of FIG. 1.

Referring now particularly to FIG. 2, the telescope 1 is journaled about horizontal axis 4 and is seen to be supported by support element 3, 3 above an upper plate 30 of data transmitter section 5, plate 30 having a central aperture protected by access cover 31. From plate 30, there extends downwardly a cylindrical shell 32 affixed to upper plate 30 by conventional fasteners such as machine screw 33. The upper mounting plate 30 and the cylindrical shell 32 form part of a casing for the data transmitter section 5 which includes therein a shaft 35 supporting a movable part of a selsyn or other data transmitter of conventional type. Shaft 35 is concerned with the performance of several primary functions of the apparatus, since it cooperates with the transmitter of data transmitter section 5 and with the novel control elements of control section 9, and since it furthermore, as is seen in FIG. 3, supplies support for the gyroscopic elements of the invention.

The control section 9 of the apparatus has an apertured upper disk-shaped mounting plate 6 which supports a centrally located ball bearing 43 in which shaft 35 is rotatable. Shaft 35 is additionally supported by a bearing 86 within the control section 9, as will be further described. It is thus supported for free rotation so that it may, in turn, support a rotor of data transmission system 5 for rotation about vertical axis 2. For this purpose, the upper plate 30 of data transmission section 5 is provided with an aperture wherein is supported one part of a ball bearing 34 whose second part is mounted on the upper end of shaft 35. Part of the data transmitter is supported by the cup-shape-member 40, also forming a lower portion of the casing for section 5. The cup-shaped element 40 has a central aperture and is supported for free rotation on shaft 35 by a ball bearing 41. In this manner, the parts of the data transmission section 5 and the telescope 1 may be manually rotated in azimuth by the operator.

Accordingly, means are provided for the electrical measurement of the angle between shaft 35 and the bore-sight of telescope 1 within data transmission section 5. This measurement means includes a selsyn or other conventional data transmitter lying between the upper plate 30 and cup-shaped member 40. The conventional magnetic structure 36 of one mechanically independent section of the selsyn is affixed to shaft 35 and rotates therewith along with an annular selsyn coil 37. The second portion of the selsyn, relatively rotatable with respect to the first section thereof, is clamped by the cup-shaped element 40 within the cylindrical shell 32. For example, the magnetic circuit 39 of this second portion of the selsyn may be clamped by cup-shaped element 40 against an annular flange on the internal surface of shell 32. The annular magnetic circuit 39 and the annular selsyn coil 38 supported thereby are thus evidently rotatable with respect to shaft 35, and are moved when the operator rotates telescope 1 in azimuth.

THE CONTROL SECTION

As in the aforegoing discussion of FIG. 1, the control section 9 in FIG. 2 is supplied with a cylindrical shell or outer casing 44 pending from mounting plate 6 and fastened thereto by conventional fasteners such as machine screw 60. The control section 9, as seen in FIG. 2, includes an extension of the shaft 35 that passes into the apparatus of FIG. 3 for support of the gyroscopic apparatus. As mentioned in the aforegoing material, shaft 35 is mechanically supported within control section 9, this support being accomplished in part by the ball bearing 43 residing in a suitable aperture in mounting plate 6. Further support is provided in the lower portion of FIG. 2 by a shelf plate 85 affixed to the interior surface of external shell casing 44 by conventional fasteners such as machine screw 88. An aperture provided at a central location in the shelf plate 85 contains the ball bearing 86 mounted concentrically on shaft 35 for providing the second bearing support of shaft 35.

Figure 4:
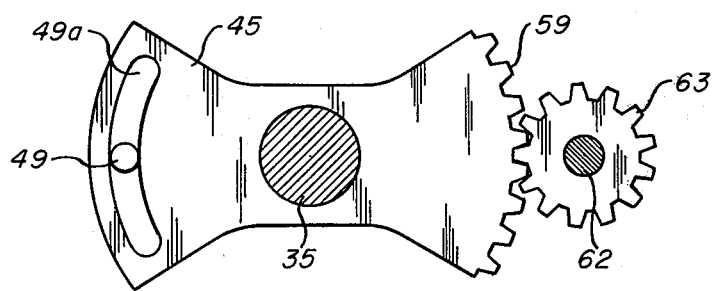
FIG. 4 is a plan view of a portion of the apparatus within the control section of FIG. 2.

As is seen in FIGS. 2 and 4, shaft 35 supports a stop arrangement and sector gear for engagement with a pinion gear 63, as will be further discussed, the sector gear and stop arrangement being supported by a hub affixed to shaft 35 by screw 46. On one arcuate side of the device are teeth forming a sector bear 59 which mesh with pinion gear 63; on the opposite side of the device, there is provided an arcuate slot 49a. A stop member in the form of a vertical rod 49 extends through the arcuate slot 49a, rod 49 being supported by brackets 47, 48 from casing 44. Since the center of the arcs forming slot 49a coincides with the center of rotation of shaft 35, the sector gear arrangement is free to rotate through a limited angular extent. It will be clear to those skilled in the art that other types of angular stops and that other arrangements of the sector gear known in the art may be employed in lieu of the illustrated arrangement.

As noted, sector gear 59 meshes with pinion gear 63; pinion 63 is affixed to a vertical shaft 62 supported by the respective ball bearings 61 and 89 suitably mounted within apertures of the mounting plate 6 and shelf plate 85. Shaft 62 and, therefore, sector gear 59 are rotated when motor 81 is energized by the supply of appropriate command signals to the motor leads 80. For this purpose, the shaft 82 of motor 81 is supplied with a worm gear 83 for driving the cooperating gear 68, thus rotating shaft 62. So that motor 81 is not stalled when stop 49 reaches one of its extreme positions, a slip clutch is provided between gear 68 and shaft 62. While various other designs of slip clutches may be employed, as will be apparent to those skilled in the art, the illustrated slip clutch includes a face plate 70 pinned at 69 with respect to shaft 62. Gear 68 is not directly affixed to shaft 62 but, without the effects of elements now to be described, is free to rotate thereon. Above gear 68 is a second face plate 67 also freely mounted on shaft 62. Finally, there is provided a collar 65 fastened at 64 to shaft 62 and having a face plate surface for compressing the helical spring 66 against the upper surface of face plate 67. In this manner, and as in conventional practice, gear 68 and shaft 62 normally rotate together. However, when the mechanical limit stop is reached, shaft 62 stops rotating and gear 68 no longer drives shaft 62. A conventional tachometer (not shown in FIG. 2) is supplied on shaft 82 within the case of motor 81 and provides a rate signal output on leads 79, as will be further described.

THE GYROCOMPASS SECTION

As previously noted, the shaft 35 seen in FIG. 2 extends into the gyrocompass section 12 of FIG. 3 and supports a generally cylindrical sealed container assembly having mating shell portions 104 and 112 closed by a bottom end 119 for containing the floated gyrocompass assembly. In particular, the upper cover plate 101 of this sealed follow-up assembly is fastened to the lower end of shaft 35 in a suitable manner, as by machine screw 100 and the cooperating hub 102. The upper cylindrical container portion 104 of the follow-up assembly is fastened by any conventional suitable means at 103 to plate 101 and extends downwardly in the external casing 44, which element 44 may be in the shape of a truncated conical shell capped by an end plate 120. The external casing 44, 44a is made impervious to dust and to fluids for the protection of the mechanisms contained therein.

Within the follow-up container portion 104 and the downward extension 112 thereof is contained a floated gyrocompass assembly. That assembly is floated in a suitable gyroscope floatation fluid filling the interior of the follow-up container portions 104, 112 to the level indicated at 108c. The floatation element enclosing the gyroscope includes a top portion 107 in the shape of a shallow cone. As will be further described, the cone 107 supports an electrically active cruciform element 105; element 105, which will be discussed in further detail in connection with FIGS. 6 through 9 is in normal operation substantially centrally located between pairs of electromagnetic pick off and torquer devices as generally indicated at 106 that additionally serve to exert centering forces on the cruciform element 105, as will be further discussed. It will be seen that the pairs of pick off-torquer-centering devices of assembly 106 are supported by pluralities of bracket-like support elements pending from the interior surface of the cover plate 101. Affixed to the conical cover plate 107 of the floatation element and forming a sealed part of it is a downwardly extending thinwalled shell 108 of generally cylindrical character within which is formed a normally horizontal support platform 109. The floatation element is completed by a thin-walled symmetric hemispherical shell 115 affixed to the cylindrical shell 108 at platform 109.

An annular reentrant portion 111 of the follow-up casing 104 projects inwardly towards the cylindrical shell 108 so that a smaller annular gap 108b is provided between elements 108 and 111. Since the interior of container portions 104, 112 is supplied with floatation fluid up to the level 108c, the gap 108b contains such fluid. As will be further explained, electrically conducting electrodes may be supplied in the adjacent surfaces forming the gap 108b so that when an electrically conducting floatation fluid is employed, electrical power may be supplied from the operator's chassis 14 across gap 108b for driving the gyroscope rotor. It will be observed that the narrow gap 108b is ended slightly below the normal level 108c of the floatation fluid. This eliminates any adverse torquing effects which would be present because of surface tension effects within an extension of narrow gap 108b. To supply the fluid needed to fill the widened portion 108a of the gap, a relatively large reservoir 121 is placed below the floated assembly.

An aperture of the platform 109 permits installation of the gyrocompass sensitive element indicated in a general manner in FIG. 3 as including at least a gyroscope rotor 110 journaled on a shaft 114 within yokes 113, 113 supported by platform 109, shaft 114 normally lying during operation of the system substantially in a horizontal plane.

Rough centering and caging during transportation of the floatation element is aided by use of a centrally placed stop system affixed on the bottom end 119 of the follow-up container portion 112. The stop consists of a tube 117 affixed to the inner surface of end 119 and having a cylindrical bore 118 loosely accommodating a pin 116 projecting downwardly from a central location in hemisphere 115 into the bore 118.

The sensitive floated gyrocompass assembly in neutrally buoyed in a hermetically sealed floated shell consisting principally of the conical top part 107, the thin-walled cylindric shell 108, and the hemispherical shell 115 which each may be constructed of a lightweight material such as a glass epoxy molded plastic. The sealed shell may be filled with an atmosphere of a mixture of gases such as helium and nitrogen designed to reduce the windage losses of the gyroscope rotor 110 and to provide a cooling heat path from its to the exterior of the instrument. The weight of the floated sensitive assembly, including gyroscope 110, and the density of the floatation fluid in the space 131 and gap 108b are selected so that the outer surface of the conical top part 107 is normally above the free top surface of the fluid at level 108c. The shape adn apex angle of the cone are conveniently arranged to prevent condensation from forming droplets that stay on the conical surface and so that the latter surface is automatically cleared of any drops of fluid that might accumulate there during transportation of the instrument.

According to the invention, the pendulosity of the sensitive floated gyrocompass assembly is adjusted to a normal value by locating the gyroscopoe rotor 110, in which is located the largest mass of the assembly, below the center of buoyancy of the float. In the prior art, attempts have often been made exactly to balance the buoyancy of the float and its weight one against the other, a result very difficult to achieve in view of the presence of severe temperature compensation problems. According to the present invention, prior art problems of this character are avoided by ensuring that the conical top 107 of the sensitive floated assembly always projects above the free liquid surface at 108c. Variations in temperature, causing the floatation fluid either to contract or to expand, simply cause the actually floated volume to vary in direct proportion to the change in fluid density; hence, the sensitive float assembly remains in a substantially constant position relative to the follow-up housing cover plate 101. There is thus created a balance effect whereby the rise of the fluid level at 108c with increasing temperature substantially matches the drop in float projection above level 108c caused by the reduction of fluid density with rising temperature, and vice versa. The elevation of the sensitive floated assembly conical top 107 with respect to the follow-up container top 101 therefore remains substantially constant over the operating temperature range of the instrument. Therefore, perfect floatation is provided without the need of any temperature, fluid density, or float volume control. Accordingly, there is no relative vertical displacement of the sensitive float conical top 107 to cause undesirable mechanical disruption of the pick off system 105, 106. Actual tests shown that the operation of the pick off and torquer system yet to be described is relatively insensitive to variations in the vertical position of conical top 107 over a wide range of operating temperatures.

THE GYROSCOPE ROTOR SYSTEM

As will be apparent to those skilled in the art, a variety of ways are available in the prior art for supplying electrical drive power to operate gyroscope rotor 110, including slip rings, flexible leads, or the like. However, the sensitive floated gyroscopic element is preferably made free of undesired restraining torque about its vertical axis by employing a floatation fluid that is additionally capable of electrical power transmission. Accordingly, the sensitive gyrocompass float assembly and the follow-up container 104, 112, 119 are constructed of an insulating material with opposed cooperating electrically conducting electrodes at gap 108b of a corrosion resistant material such as platinum.

The floatation fluid may, for example, be an ethanol-water mixture to which potassium iodide is added to provide the desired conductivity, at least 55 per cent by weight of the formula being ethanol if freezing above −40° Centigrade is to be prevented,. A trace of sodium tetraborate may be added for pH control. The conductivity of the fluid is adjusted to minimize electrical power losses therein, for example, to about the 2 watt level.

Figure 5:
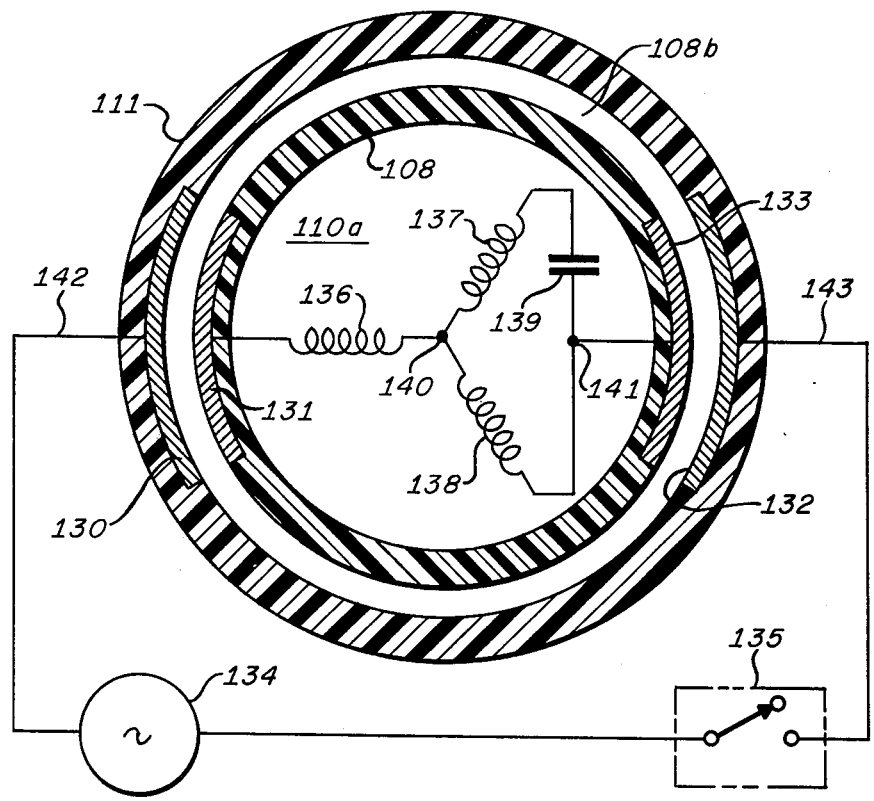
FIG. 5 is a cross section view including a wiring diagram of the driving arrangement for the rotor of FIG. 3.

FIG. 5 presents an indication of the character of the driving windings of the gyroscope 110 within the cooperating plastic shells 108 and 111 that define the conductive fluid-filled annular gap 108b. The magnetic driving field for the gyroscope 110 is supplied by a motor winding system generally indicated at 110a as including the conventional windings 136, 137 and 138 connected in wie formation at junction 140. So that the gyroscope rotor 110 is driven in a conventional split-phase manner, a fixed capacitor 139 is supplied across the terminals of windings 137, 138. Drive power from an alternating current source 134, which may be located in the control chassis 14 of FIG. 1, is supplied to drive the rotor 110. For this purpose, there is suppplied on one side of the rotor within gap 108b a pair of elongate metal electrodes 130, 131, while on the directly opposed side of the system is supplie a second similar pair of elongate metal electrodes 132, 133. With switch 135 closed, alternating current is supplied by lead 143 to electrode 132 and then across gap 108b to electrode 133, and to the winding junction 141. From junction 141, the current flows directly through coil 138 and through capacitor 139 and coil 137 to junction 140, whereupon it flows through winding 136 to electrode 131. The electrical path is completed by the conducting fluid in gap 108b so that the current then flows to electrode 130 and back to power source 134 through lead 142. In normal operation, the angular excursion of the thin-walled shell 108 from the neutral position illustrated in the drawing with respect to the annular reentrant portion 111 is small, so that adequate current for driving the rotor 110 is always available. Also, because of the apparent symmetry of the geometry of the structure shown in FIG. 5, the potential drops across the opposed fluid gaps are balanced and substantially symmetrical. A small current density, of the order of 0.04 amperes per square centimeter, is employed so as to minimize deterioration of the conducting fluid and erosion of the electrodes.

THE CENTERING-TORQUER-PICK OFF SYSTEM

Apparatus for performing the important functions of centering the floated assembly within the follow-up container, for serving to measure the azimuth angle between the same two elements, and for applying corrective azimuth torque to the floated container has been briefly mentioned in connection with FIG. 3. The novel features of a unitary system for performing these three functions will now be discussed in further detail in connection with FIGS. 6 through 10.

Figure 6:
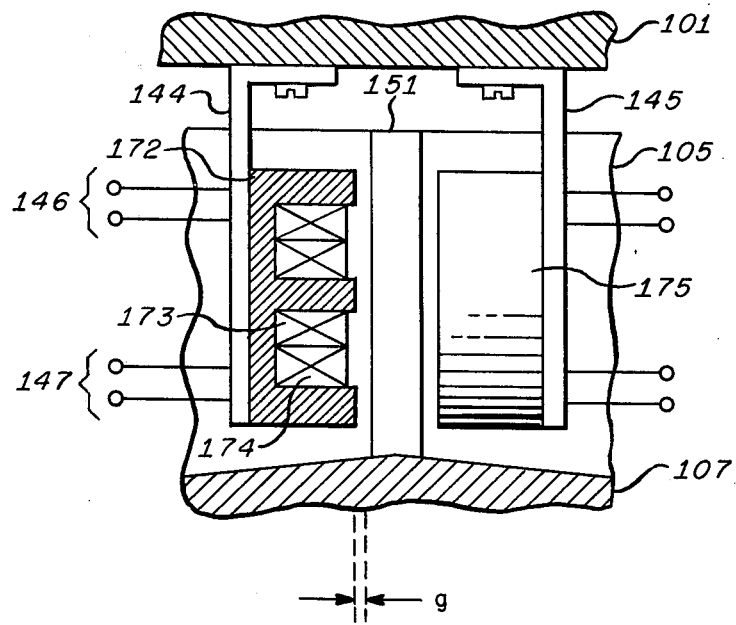
FIG. 6 is an elevation view partly in cross section of elements of the torquer-pick off of FIG. 3.

The three necessary functions are performed by an arrangement making use of eddy current phenomena, its operation depending upon the fact that the inductance of a coil in the proximity of a sheet of electrically conducting material is a function of the gap between the coil and the sheet, assuming for example, that the plane of the sheet is substantially at right angles to the coil axis. It is well established that this influence results because eddy currents are induced in the conductive sheet by any time-varying magnetic flux from the coil, with the consequence that a magnetomotive force is produced having a polarity tending to oppose any change in the flux. When the frequency of excitation of the coil is relatively high, and when the sheet is a good electrical conductor of sufficient thickness, alternating flux is almost totally excluded from the interior of the sheet. For a very large spacing between the coil and the conductive sheet, there is little change in the total reluctance of the magnetic circuit; however, as the conductive sheet is brought closer to an end of the coil, the volume of space between the coil and conductor is reduced and the effective inductance of the coil is correspondingly reduced. As the gap between the coil and the sheet is increased somewhat, the effective inductance of the coil is correspondingly increased. This beneficial effect is strengthened when a magnetic core is associated with the coil, for example, such as core 172 in FIG. 6, which is open at one side to face a conductive sheet such as sheet 151 so that it is only in the small gap between the opposed face of core 172 and the surface of sheet 151 that significant magnetic flux is present external of the actual core. Such ferrite cores commonly have an open annular internal volume between a center post and an external annular shell, as illustrated in FIG. 6. In the present invention, the annular space is used, for example, to accomodated a pair of concentric coils such as coils 173 and 174 provided in FIG. 6 with respective electrical lead pairs 146 and 147.

Figure 7:
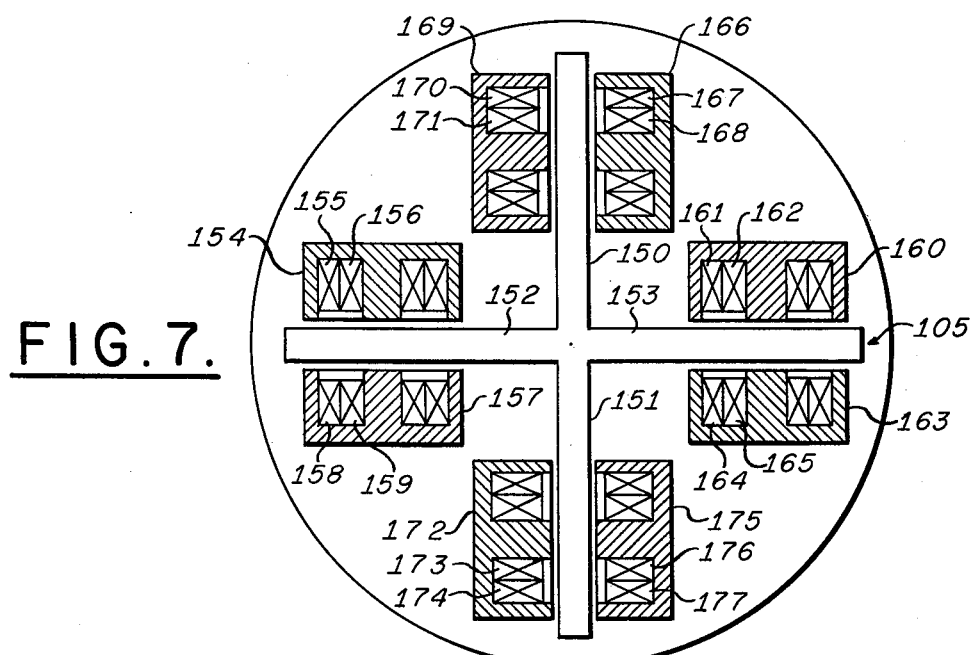
FIG. 7 is a plan view partly in cross section of the complete centering-torquer-pick off system of FIG. 3.

As seen in FIG. 7, four pairs of such coil assemblies are respectively associated with the conducting metal arms 150, 151, 152, 153 of the cruciform element 105. As in FIG. 6, cooperating opposed coils, such as those associated with cores 172, and 175, may be supported to provide small gaps of width g with respect to the conducting arm 151, for example. The several pairs of cores, such as cores 172, 175, are respectively supported by any convenient means such as by the illustrated brackets 144, 145 from the follow-up cover plate 101. It will be understood that the cooperating cruciform element 105 is shaped to be affixed in any convenient manner to the conical top part 107 of the floated assembly of the instrument.

It may be demonstrated that a coil such as coil 173, when excited at a relatively high frequency and when facing an aluminum sheet of 0.063 inch thickness, for example, will have an inductance that can be expressed approximately by equation (1):

$$L = L_o - \frac{k}{g_o + g} \quad (1)$$

where $L_o$, $k$, and $g_o$ are constants, $g$ again representing the physical gap dimension illustrated in FIG. 6.

It is seen in FIGS. 3 and 7 that the complete assembly involves the structure placed on the top of the conical element 107 of the float assembly, including the cruciform element 105 having four substantially equally dimensioned arms 150, 151, 152, 153, each being affixed to element 107 and each being associated with opposed oppositely facing coil systems of the type illustrated in FIG. 6 in connection with a conducting arm 151 and the coil systems associated with cores 172 and 175. For example, arm 152 interacts with the core 154 and the oppositely facing core 157, these cores respectively including coils 155, 156 and 158, 159. The arm 150 is associated with oppositely facing cores 166 and 169 which respectively cooperate with pairs of concentric coils 167, 168, and 170, 171. In a similar manner, the remaining arm 153 of the cruciform element 105 is associated with oppositely facing cores 160, 163 cooperating respectively with pairs of internally mounted coils 161, 162 and 164, 165. It will be understood, of course, that the several cores and the coils they include are rigidly supported from the follow-up cover plate 101 so that they all move relative to cruciform element 105 whenever there is relative motion between follow-up cover plate 101 and the conical top part 107.

It will be understood by those skilled in the art that one aspect of the invention provides at least a first electrically conductive vane disposed summetrically upon a pendulous floated gyroscopic assembly and having first respective opposed electrically conductive surfaces at a first part thereof; further, it includes at least a first pair of inductors pending within a follow-up container at a first path for forming a first pair of opposed gaps for generating eddy current flow within the respective opposed electrically conducting surfaces at the first part when excited, thereby generating when the opposed gaps are unequal, a differential restoring force tending to equalize the first pair of opposed gaps.

Additional pairs of inductors may be used cooperatively with additional opposed conductive surfaces.

Figure 8:
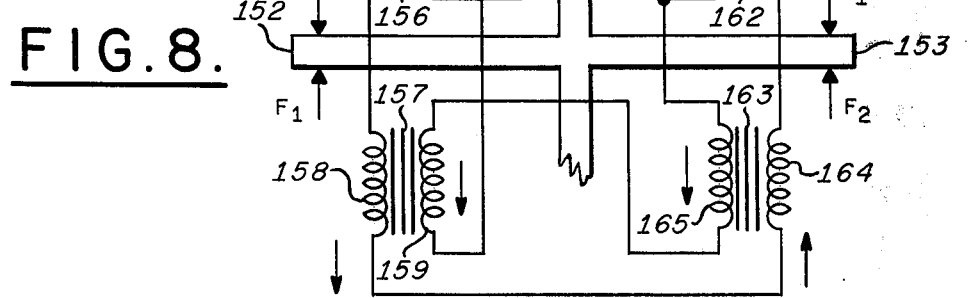
FIGS. 8 and 9 present electrical wiring diagrams of portions of the apparatus of FIG. 7.

Cooperating with the diametrically opposed conducting arms 152 and 153 of the cruciform element 105, as seen in FIG. 8, is an excitation and torquer current system involving the coils associated in FIG. 7 with cores 154, 157, 160, and 163. The torquer control input terminals 178 and 179 are coupled to a series circuit including the coil 155 of core 154, the coil 159 of core 157, the coil 164 of the core 163, and the coil 161 of core 160. To the terminals 178 and 179 is supplied a torquer control current developed as will be described in connection with FIG. 10. This variable phase torquer control input current cooperates with a fixed phase high frequency reference current supplied at terminals 180, 181. The latter fixed amplitude, fixed phase current is passed in series through coil 165 associated with core 163 and coil 159 of the core 157 before returning to terminal 180. The fixed field high frequency current is also coupled through a parallel-connected circuit that includes coils 156 and 162 so that the current flows through coil 162 of core 160 and then through coil 156 of core 154 before returning to terminal 180. It is seen that respective pairs of coils are magnetically coupled together by cores 154, 157, 160, and 163 are previously described in connection with FIGS. 6 and 7. It will be seen that these several cores, depending upon the nature of the variable torquer control current applied to terminals 178 and 179, usefully influence the torques applied by the several cores to the conducting arms 152, 153 for controlling the azimuth position of the cruciform element 105. It will be noted that the torquer control current flows in a first sense through coils 155 and 158 and in the opposite sense through coils 164 and 161. On the other hand, the fixed phase field current flows in the same sense through coils, 159 and 165, but in a sense opposite to the latter sense through coils 156 and 162, as indicated in the drawing.

Figure 9:
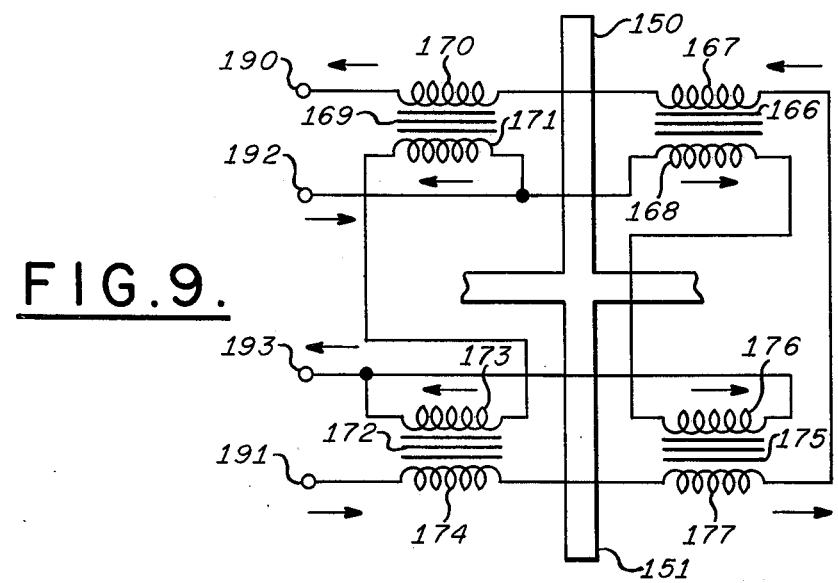

As will be seen from FIG. 9, a circuit very similar in appearance to that of FIG. 8 is used for azimuth angle pick off purposes. In FIG. 9, and cooperating with the diametrically opposed conducting arms 150 and 151 of the cruciform element 105, is an excitation and pick off system involving the coils associated in FIG. 7 with cores 166, 169, 172, and 175. Pick off terminals 190 and 191 are coupled to a series circuit including the coil 174 of core 172, the coil 177 of core 175, the coil 167 of core 166, and the coil 170 of core 169. The terminals 190 and 191 supply a pick off signal used as will be described in connection with FIG. 10, the pick off signal being cooperatively generated through the presence of a fixed high frequency reference current supplied at terminals 192, 193. The latter fixed amplitude and phase current is passed in series through coil 168 associated with core 166 and coil 176 of the core 175 before returning to terminal 193. The fixed field current is also coupled through a parallel-connected circuit that includes coils 171 and 173 so that the current flows through coil 171 of core 169 and then through coil 173 of core 172 before returning to terminal 193. It is seen that respective pairs of coils are coupled together by cores 166, 169, 172, and 175 as previously described in connection with FIGS. 6 and 7. It will be seen that these several cores, depending upon their proximity to cooperating arms 150, 151, yield useful error output signals in proportion to the error in the azimuth position of the cruciform element 105. It will be noted that the pick off current flow in a first sense through coils 174 and 177 and in the opposite sense through coils 167 and 170. On the other hand, the fixed field current flows in the same sense through coils 168 and 176, but in a sense opposite to the latter sense through coils 171 and 173 as indicated in FIG. 9.

The three important functions performed cooperatively by the integrated centering-torque-pick off system of FIGS. 7, 8, and 9 are most readily explained separately and the operation will therefore first be explained that is involved in centering the floated assembly and especially for centering the thin-walled shell portion 108 thereof with respect to the portion 111 of the follow-up assembly so that the annular gap 108b is maintained substantially uniform.

For understanding the float centering operation, the following analysis is of interest. The coil-core inductor combinations employed in the system are commonly understood to be energy storage devices, the mean stored energy in any one such inductor being:

$$W = \tfrac{1}{2} L I^2 \qquad (2)$$

where $W$ is in coulombs when $L$ is in henries and $I$ is in amperes. If the current source at terminals 180, 181 supplies an alternating current of constant amplitude and phase, the rate of change of the mean stored energy with a changing gap dimension $g$ is:

$$\frac{dw}{dg} = \frac{1}{2} I^2 \frac{dL}{dg} = \frac{1}{2} I^2 \frac{k}{(g + g_o)^2} \qquad (3)$$

The separating or repelling force acting between one of the conducting arms and a cooperating coil and core inductor assembly is therefore:

$$F = \frac{1}{2} I^2 \frac{k}{(g + g_o)^2} \times 10^7 \text{ dynes} \qquad (4)$$

where $g$ and $g_o$ are in centimeters and their sum represents the effective dimension of the gap.

If cooperating opposed similarly-excited coil and core inductor assemblies are located one on each side of the conductive sheet, as at 151 in FIG. 6, with small but equal gaps $g$ on both sides of arm 151, the generated repelling forces are exactly equal and opposite and therefore are in precisely balanced relation. If the end of arm 151 in FIG. 6 is then, for example, closer to core 175 than to core 172, the repelling force will increase on the side with the smaller physical gap, but will necessarily fall on the side with the greater physical gap. Thus, a net restoring force is generating tending promptly to translate the end of arm 151 to a position again exactly centered between coils 172, 175. It may readily be shown that, for very small displacements of arm 151 from its center position, the centering force spring rate $K$ is:

$$K = -2 \frac{dF}{dg} \qquad (5)$$

$$= \frac{2K I^2}{(g_o + g)^3} \times 10^7 \qquad (6)$$

$$= \frac{4F}{g_o + g} \text{ dynes per centimeter.} \qquad (7)$$

The centering force is enhanced in the preferred configuration of FIG. 7 where four pairs of coil assemblies are associated with the arm of cruciform element 105.

Since each set of pairs of coils acts as described in the foregoing, it will be apparent that the configurations of FIG. 8 and 9 provide accurate centering of the sensitive floated element within the follow-up container along two respective orthogonal axes. Further, the configurations, with complete compatability, respectively provide desired azimuth torquing and azimuth error pick off functions yet to be discussed in further detail.

Referring to FIG. 8, torquing of the floated element as well as centering thereof is accomplished in the novel apparatus. For torquing the cruciform element 105 into its correct position, a constant phase current of appropriate high frequency and magnitude is again maintained in each of eight coils, one each of the eight coils lying in each of the eight coil-core inductor assemblies (coils 156, 159, 162, 165, 168, 171, 173, 176). For cooperation with coils 156, 159, 162, 165, an additional coil is placed in each of the four cores 154, 157, 160, 163 lying along one axis of the system generally perpendicular to arms 152, 153; these are the respective torquer coils 155, 158, 161, 164 connected in series in FIG. 8. When a current changing in phase is passed through coils 155, 158, 164, 161, it will change the mean energy stored in each effective inductor. The energy may be lowered, for example, in the two inductors in which the magnetomotive forces oppose and will be raised in the two in which the magnetomotive forces add for a torquer control current input of a particular phase at terminals 178, 179 flowing as indicated by the arrows; for the reversed phase conditions, the effect will be reversed. As previously indicated, the repelling forces acting on each side of the arms 152, 153 change in accordance with the change in the stored energy distribution. Because the centers of the coil-core assemblies are physically displaced by a distance R from the mid-point of cruciform element 105, there will be a net torque T tending to rotate element 105:

$$T = 2R (F_1 - F_2) \quad (8)$$

where $F_1$, as before, is the force produced by each of the inductor assemblies associated with cores 157 and 160 of FIG. 8 and $F_2$ is again the force produced by each of the inductor assemblies associated with cores 154 and 163. Assuming, by way of example, that there are equal numbers of turns on all coil windings, and that $dL/dg$ is in henries per centimeter, I is in amperes, and R is in centimeters:

$$F_1 = \frac{1}{2} \frac{dL}{dg} (I_1 + I_2)^2 \times 10^7 \text{ dynes} \quad (9)$$

$$F_2 = \frac{1}{2} \frac{dL}{dg} (I_1 - I_2)^2 \times 10^7 \text{ dynes} \quad (10)$$

$$F_1 - F_2 = 2 I_1 I_2 \frac{dL}{dg} \times 10^7 \text{ dynes} \quad (11)$$

$$T = 4R I_1 I_2 \frac{dL}{dg} \times 10^7 \text{ dyne centimeters} \quad (12)$$

$$T = 2R I_1 I_2 \frac{k}{(g_o + g)^2} \times 10^7 \text{ dyne centimeters} \quad (13)$$

When $I_1$ is held constant, the resultant torque is seen to depend linearly on $I_2$. Also, it is seen from equations (6) and (13) that it is particularly desirable that the physical gap g and the effective gap ($g_o + g$) be kept small. The value $g_o$ is made small by symmetric design of the torquer and by use of the high frequency excitation current. Furthermore, it will be apparent to those skilled in the art that, as an alternative to using two coils in association with each core, the same desirable result may be achieved by summing the two currents by a conventional summing circuit before application of the sum to a single coil in each core.

It will be apparent to those skilled in the art that one aspect of the invention includes at least a rotational pick off responsive to relative rotational departure of a follow-up container from a pendulous floated gyroscopic assembly for generating a reversible phase alternating control signal whose phase is determined by the direction of the rotational departure, and a single generator for exciting at least a first pair of inductors in parallel relation with a constant phase alternating excitation signal; further, it includes at least first series inductive control means responsive to said reversible phase alternating control signal for differentially changing the energy stored in the respective inductances of the first pair of inductors whereby a differential force is coupled to a first cooperating vane for reducing the rotational departure to substantially zero. It will be apparent that additional pairs of inductors and inductive control means may be similarly cooperatively operated with such vane elements as are herein described.

The operation of the angular position pick off assembly of FIG. 9 is concerned with a system very similar in structure to that of FIG. 8, and may be regarded as an analogous or reciprocal kind of system when connected according to the invention. In other words, the system of FIG. 8, operating in conjunction with the conducting arms 150, 151 of cruciform element 105, generates a positional error-correcting torque using an error input, while the analogous physically identical system of FIG. 9 generates a measure of positional error as an output caused by the action of a torque.

Referring to FIG. 9, the generation of the angular error signal depends upon the fact that, when a relative rotation occurs between arms 150, 151 and the associated inductors, two diagonally opposite gaps decrease while the other two gaps 3 increase. Thus, the gaps associated with cores 166 and 172 might decrease, while the gaps proximate cores 169 and 175 might increase in size. The effective inductances of the coil-core systems decrease when the gaps decrease and vice versa. In the example, this action may result in a rise in the voltage across two primary coils 171 and 176 and a reduction in the voltage across the other two primary coils 168, 173.

Because each primary coil 168, 171, 173, 176 is closely coupled to a corresponding secondary coil 167, 170, 174, and 177, there are induced corresponding changes across each respective secondary coil. These secondary coil potential changes are summed by virtue of the series connection of secondary coils 174, 177, 167, 170 and the net result is an output voltage at terminals 190, 191 which is zero when all effective gaps are equal. The output voltage is of one phase for one direction of azimuth rotation of the cruciform element 105 and is of the opposite phase for the opposite direction of azimuth rotation thereof.

It will be apparent to those skilled in the art that one aspect of the invention includes signal generator means for exciting at least a first pair of inductors coupled in parallel relation whereby the respective inductances thereof change differentially in dependance on the direction of rotational departure of first vane means with respect to the first pair of inductors, and further includes at least first series connected sensor means responsive to the differential inductance change for generating a first reversible phase alternating control signal whose phase is determined by the direction of the rotational departure. It will be apparent that additional inductors and sensors may be similarly employed.

The primary coils 168, 171, 173, 176 are connected in FIG. 9 in series-parallel. Though other arrangements may be used, this series-parallel connection provides a favorable radial centering stiffness for a given rotational stiffness. When a pure translation occurs, both primary coils of a series pair such as coils 168, 176 increase in inductance on the side of the larger gap, while coils 171, 173 decrease in inductance, and vice versa. The resulting changes in the primary currents desirably increase the centering stiffness of the system. When only a pure relative rotations occurs, the primary currents are essentially unchanged because the inductance of one coil rises while that of the cooperating coil decreases; for example, coil 171 rises in inductance while the inductance of coil 173 is correspondingly diminished.

THE DUAL LOOP CONTROL SYSTEM

Figure 10:
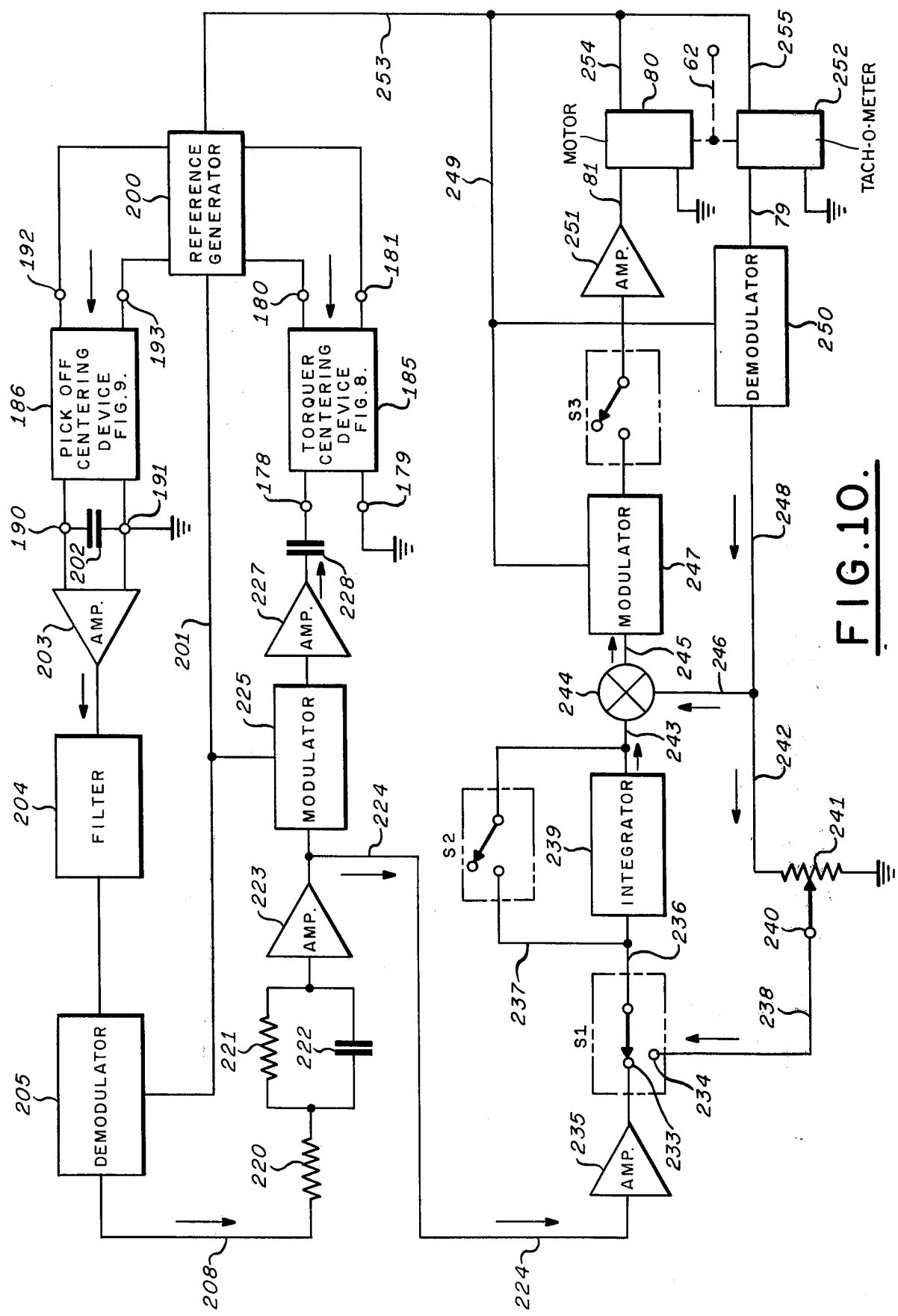
FIG. 10 is a diagram showing electrical components and their interconnections for the dual-loop servo system employing the apparatus of FIGS. 7, 8, and 9 for iterative movement of the gyroscope into alignment with geographic north.

The torquer-centering system 185 of FIG. 8 and the pick off-centering system 186 of FIG. 9 are cooperatively employed in the dual loop system of FIG. 10 for operating servo motor 80 also shown in FIG. 2, which motor, as previously described, is adapted to reposition the follow-up container and, therefore, the eight coil-core inductor assemblies of FIG. 7. For this purpose, the oscillator or reference generator 200 provides an alternating current excitation signal to the terminals 192, 193 of pick off-centering device 186. The alternating error output of the latter device is coupled at its output terminals 190, 191 across capacitor or compensating impedance 202, whose function will be further described. Terminals 190, 191 serve also as inputs to the high input impedance alternating current amplifier 203, whose output is filtered by the narrow band filter 204 before supply to demodulator 205. A second or reference input to demodulator 205 is that output of reference generator 200 supplied via lead 201 to demodulator 205 as a reference signal for converting the error signal output of filter 204, into a reversible polarity, direct current error signal. While this output signal from reference generator 200 may be selected to have any of a wide range of values, a typical frequency is 20 kHz.

The output of demodulator 205 is supplied through lead 208 and resistor 220 to a signal shaping network consisting of resistor 221 and capacitor 222 disposed in parallel. The output of the shaping network is supplied through the direct current amplifier 223 to a modulator 225 and also via the branching lead 224 to apparatus yet to be described. The direct current signal input to modulator 225 is converted into an alternating signal for virtue of the supply of the reference output of oscillator 200 via lead 201 to modulator 225. This converted alternating signal is supplied to the low output impedance power amplifier 227 whose amplified alternating signal output is coupled by capacitor 228 or compensating impedance to the input terminals 178 and 179 of the torquer-centering device 185 of FIG. 8. There is thus formed a first or inner servo loop which will be seen to control the dynamics between the floated element and the follow-up housing, the shaping network 221, 222 aiding its operation by providing fast settling and good stability. The input terminals 180, 181 of the torquer-centering device 185 are also supplied with the same output of reference generator 200 as is used to excite device 186, demodulator 205, and modulator 225. An output of reference oscillator 200 on lead 253 is also employed as a reference voltage elsewhere in the control system, as in modulator 247 and demodulator 250, yet to be described.

For operation of servo motor 80 in the second or outer servo loop for driving the follow-up container to alignment with north, the shaped direct current error signal output of amplifier 223 is supplied via lead 224 to the low pass amplifier 235 whose output, in turn, is coupled to a conventional integration circuit by switch S1 when it is properly actuated. Switches S1, S2, and S3 are represented in the figure as simple mechanical switches for the sake of clarity, but it will be understood that well known electronic switches, including transistor switches, may readily be used in performing the functions of the switches. For convenience, however, they are illustrated as ordinary mechanical switches. Accordingly, when switch S1 is conducting through the path including terminal 233 and lead 236, the error signal is coupled through integrator 239 and by lead 243 to a conventional summation circuit 244. Coupled around integrator 239 is a short-circuiting path 237 which may be closed or open depending upon whether or not the conducting path of switch S2 is complete or broken. The signal on lead 243 and any signal on lead 246 may be added algebraically in summation device 244 and are supplied as a direct current signal to the previously mentioned modulator 247. Any alternating output of modulator 247 is supplied when switch S-3 conducting through a conventional power amplifier 251 and input lead 81 to drive the servo motor 80. It is seen that servo motor 80 is coupled to the shaft 62, also illustrated in FIG. 2. It is understood, of course, that the split clutch and limit stop system illustrated in FIG. 2 may readily be included in the structure.

Directly linked to the rotor of motor 80 is the rotor of a conventional tachometer 252 that produces, for example, an alternating current output having an amplitude proportional to the speed of rotation of motor 80. This is supplied by lead 79 also seen in FIG. 2 to the demodulator 250, demodulator 250 being additionally supplied with a reference frequency output of reference generator 200 via leads 253 and 249. The latter connection is made so that the signal on lead 79 is converted to a direct current signal then supplied via leads 248 and 246 to the previously mentioned second input of summation device 244. Demodulator 250 is not required if generator 252 produces a direct current rate signal. The output of demodulator 250 is also coupled via lead 242 across potentiometer 241. This potentiometer acts as a function generator and has a tap 240 which may be set when the operator adjusts knob 21 of FIG. 1 according to the cosine of the local latitude at which the surveying operation is being conducted. Thus, the demodulated signal modified by the cosine of local latitude may be supplied by lead 238 to a second terminal 234 of switch S1. It will be understood that servo motor 80 and tachometer 252 may be supplied with appropriate fixed field excitation in the conventional manner via leads 254 and 255 from reference generator 200.

Referring again to the foregoing discussion of FIGS. 7, 8, and 9, any significant rotational spring effect inadvertently present in the torquer system 185 or the pick off system 186 is evidently undesirable because it would result in a coercive torque which is not represented by a component of the correcting current passing through the torquer coils and arriving at output terminals 190, 191. With respect to FIGS. 9 and 10, the output of device 186 at terminals 190, 191 may be viewed as being supplied to an effective external electrical impedance. When a relative rotational displacement of the floated assembly occurs, the device 186 generates an output voltage and the resultant current would flow through that external impedance; this current is also evidently coupled inductively through cores to the secondary coils of device 186. Now, the internal connections of the pick off device 186 are identical to those of the torquer device 185 and there will therefore be a torque produced proportional to the inductively coupled current, a torque that is inherently proportional to the aforementioned rotational displacement. For this same rotational displacement, if this torque were equal and opposite to the torque that would result with the output 190, 191 open circuited, there would be a compensating effect and the net spring rate would desirably be zero. Accordingly, it will be understood by those skilled in the art that a capacitor 202 placed across terminals 190, 191 will provide the desired compensation effect if experimentally adjusted so that the proper output impedance is achieved. The compensating capacitor will in effect be adjusted manually, as will be understood by those skilled in the art, to compensate for minor departures from dimensional design parameters of the pick off system 186 during assembly of the instrument.

The series connected capacitor 228 serves in an analogous manner to compensate the torquer device 185, the capacitor 228 being coupled in series relation between terminal 178 and the output of power amplifier 227. The driving amplifier 227 is provided with a large negative voltage feed back so that it has a very low output impedance, and so that the current through the torquer control coils is then the sum of that due to the input to driver amplifier 227 and that due to an actual angular displacement of the torquer. The desired compensation is again achieved along with the desired low spring stiffness by experimental adjustment of capacitor 228.

SYSTEM OPERATION

Operation of the inner loop of FIG. 10 and the interplay between pick off-centering device 186 and the torquer-centering device 185 will be apparent from the foregoing discussion, it being understood that the novel surveying device is, as in FIG. 1, first placed on a tripod, is oriented with respect to north as well as can be achieved using the simple magnet compass 7, and is leveled using bubble level 8. Also, the latitude correction is set in by operating the knob 21. After gyroscope rotor 110 is run up to operating speed, the floated assembly is automatically centered, to remove any translational displacements with respect to the coil assembly, upon excitation of the device 185 and 186 by oscillator 200. Any azimuth rotational error between the corecoil inductor assembly and the cruciform element 105 is at once detected and an error signal is supplied by the pick off system of device 186 to excite the torquer coils of device 185 promptly to reduce the error to zero. Consequently, the spin axis of the gyroscope rotor 110 is also oriented in an approximately northern direction and the floated element accurately tends to remain precisely at the azimuth position of the follow-up container element because of the feed back action in the inner loop. Any perturbing effect of the gyroscope is used in the outer loop of FIG. 10 to reorient the follow-up system so that it is finally aligned to true north. A persistant error signal that appears on lead 224 is used as will be further described to torque shaft 62 toward alignment with north and, as a consequence, to move the selsyn elements 36, 37 of FIG. 2 and the follow-up container itself to the northerly alignment. As will be described, the rotation to north is advantageously accomplished in steps, the follow-up container being driven in an iterative fashion to the azimuth angle where no average torque is required to maintain alignment between the floated assembly and the follow-up container, the spin axis of rotor 110 then being oriented toward north. At the completion of the steps of this process, the outer loop servo operating servo motor 80 is locked and the inner feed back loop provides only damping.

FIGS. 11, 12, and 13 will be used in explaining the sequential steps employed in operating the outer loop and the several modes of operation of that loop according to the status of switches S1, S2, and S3. In FIG. 11, the power for exciting the instrument is switched on at time zero so that for the ensuing period of one minute, for example, the gyro rotor 110 is run up to its operating speed. The one minute period is typical of one typical standard gyroscope rotor, though other intervals may be used for rotors having various other characteristics. Events will be described as occurring at representative times expressed in minutes and seconds. Thus, at the end of time 1:00, the inner loop is permitted to settle, which operation ends at time 1:30. Integration is performed between times 1:30 and 1:45. The result of the integration process is used to drive servo motor 80 in the interval between 1:45 to 1:49, completing the first step. The drive power is removed and the inner loop is permitted again to settle between times 1:49 and 2:49. Integration and driving of motor 80 again occurs between times 2:49 and 3:04 and 3:08, completing the second step. The third operational step again includes settling, integration, and driving respectively between the times 3:08 and 4:08, 4:08 and 5:08, and 5:08 and 5:12. The angular output of the instrument appearing on the display 19 of FIG. 1 may then be read by the observer.

To effect this triple step operation, switches S1, S2, and S3 are programmed as in FIG. 12 by a conventional timing control arrangement such as shown in FIG. 13. Timer 260 is a conventional timer micro-circuit available on the market, as is the counter and logic circuit 261 driven by timer 260. The counter 261 operates in a conventional manner to supply switching signals to switch 135 of FIG. 5 and to the outer loop switches S1, S2, and S3. The timer control combination illustrated in FIG. 13 operates in an entirely conventional manner to open and to close the several switches according to the program in the table of FIG. 12. It will be understood that the electronic switching system of FIG. 13 is the equivalent of motor driven slip-ring switching devices of entirely conventional nature, mechanical arrangements any of which could readily be substituted for the timer system represented in FIG. 13.

Referring to FIG. 13 with respect to the program of FIG. 12, the switches S1, S2, and S3 associated with the outer loop are set in particular positions during the run up of gyroscope rotor 110. Then, switch S1 contacts terminal 233, switch S2 is closed, and switch S3 is open. During each of the settling periods, switch S1 contacts terminal 233, switch S2 is closed, and switch S3 is open. During the several integration intervals, switch S1 contacts terminal 233 and switches S2 and S3 are both normally open. When servo motor 80 is being driven, switch S1 contacts terminal 234, switch S2 is open, and switch S3 is closed. Finally, after the successive steps have been completed and the display 19 is to be read, switch S1 contacts terminal 233, switch S2 is closed, and switch S3 is open.

At the time of the reading of the display 19, the apparatus of FIG. 14 is employed. It will be understood that the data transmission section 5 of FIG. 2 then feeds selsyn angular position information to a conventional data transmitter-to-digital converter 265 which supplies operating signals in any conventional manner via the bundle 266a of electrical leads to a conventional display 266. The latter will then supply a direct reading in numeric symbols on read-out 267 of the angle between shaft 35 and the azimuth setting of telescope 1, used by the operator in the normal manner, for instance, to measure target angles with respect to true north.

With respect to FIGS. 11 and 12 and the operation of the outer loop of FIG. 10 during the successive settling modes of the apparatus, it will be seen that the error output on lead 224 passes through switch S1 and integrator 239, but switch S3 is open so that motor 80 is not driven. At the start of each successive integration period, switch S1 still provides a current path to integrator 239. Switch S2 remains closed only momentarily to ensure that integrator 239 remains positively re-set to zero at the very start of the integration period, but is then opened so that the integration function is now performed. Again, switch S3 is open and the outer loop servo motor is not driven. The resultant integrated output is a measure of the departure of the spin axis of gyro rotor 110 with respect to true north.

During each of the successive drive modes of operation, the input error signal is disconnected, since switch S1 is moved to terminal 234, breaking the input path of error signal flow. Switch S2 remains open. Of significance also is the fact that switch S3 is made conducting, passing the integrated signal through amplifier 251 and to servo motor 80, causing it to drive the shaft 62. Operation of servo motor 80 also produces a rate signal output on lead 79 of tachometer 252 which is demodulated and added algebraically to the output of integrator 239. The rate signal on lead 242 is further fed through latitude potentiometer 241 back into the input of integrator 239. Operation of servo motor 80 is thus automatically continued until the output of integrator 239 is driven to zero by the output of tachometer 252. The resultant drive angle is made accurately equal to the measured angle from north by conventional scaling so that the initial north pointing error is greatly reduced. The first, second, and third of the iterative steps are present so that the pointing error just before read out is substantially zero.

The principles involved in the iterative operation may be explained in a further simple manner. Consider that the gyroscope rotor 110 is located at a local latitude λ with its spin axis at an angle θ with respect to true geographic north. If the axis is to continue that orientation, it will be understood that, because of the rotation of the earth, there must be maintained a torque on the rotor about the vertical axis given by:

$$T = \Omega H \cos \lambda \sin \theta \tag{14}$$

where $H$ is the angular momentum of the rotor and $\Omega$ is the earth's rotation rate. In the actual embodiment of the instrument, use is made of equation (14) by a mechanization in which a pendulous gyroscope is kept pointing in a fixed direction by application of the required torque about the vertical axis. This torque is a measure of the angle of the rotor spin axis away from north and the gyroscope can be rotated through this error angle to bring it to north. Because the relationship between rate and angle contains the factor cos λ, there must be a correction made for the value of latitude.

It is evident that for large values of the angle θ, the allowable percentage error in making the measurements must be very small if the final pointing error is to be small. Also, there must be a correction for the fact that the torque is proportional to sin θ and not directly to θ. As an example, if the initial value of θ is 30°, a final pointing error of one half minute would require an overall accuracy of about 0.03 percent; this would be very expensive to attain and would require very accurate setting of the latitude value. To overcome this difficulty, the novel iterative procedure is used for reducing large initial pointing errors to small values so that practically attainable accuracy will be satisfactory. For instance, reduction of an initial error of 30° to a final pointing error of ½ minute in three steps requires an accuracy for each per step of about 6 percent; this allows use of the approximation of sin θ by θ itself and a latitude setting as roughly accurate as two degrees. Further, it does not place impractical limitations on other aspects of the mechanization.

Thus, during run up of the gyroscope rotor 110 and during the settling part of the first approximation step (FIG. 11), the gyroscope rotor has come up to its normal operating speed and the inner loop of the system has electronically stabilized the floated assembly. At this time, the follow-up container will not usually be precisely aligned with north. The switching system now switches the outer loop into its integrating mode and then to a drive mode. As a consequence, the follow-up housing is pointed more nearly toward north. In the second step, after settling, the integrating and driving procedure is repeated, again to move the follow-up housing more nearly toward precise northerly alignment. The third step is arranged to orient the follow-up container precisely toward north, completing the cycle.

At the instant that the timing circuits switch the outer loop to the drive mode, the output of integrator 239 is modulated (247) by the reference sine wave and the input to integrator 239 is switched to the output of tachometer 252. The motor 80 will therefore drive shaft 62 through an angle proportional to the charge initially stored during the integration mode within integrator 239. The effective gain of the feed back loop is adjusted by the setting of tap 240 of the latitude potentiometer 241 so that latitude compensation is effected quite adequately, even though the correction set in manually is normally only an approximate correction. The minor noise signals present in the system are reduced in effect also by the integration process whereby the measured torque is averaged over a sufficient period of time to reduce them to an acceptable low level so that the result of integration is accurately a measure of the angle $\theta$.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gyroscopic surveying compass comprising:
   support means,
   external casing means affixed to said support means,
   sealed follow-up container means journaled for rotation normally about a vertical axis within said external casing means,
   floated gyroscopic assembly means within said follow-up container means buoyantly supported by liquid contained within said follow-up container means,
   gyroscope rotor means journaled about a normally horizontal axis within said floated gyroscopic assembly means,
   motive means responsive to the difference between the azimuth position of said floated gyroscopic assembly means and said follow-up container means for driving said follow-up container means into alignment with said floated gyroscopic assembly means,
   sighting means journaled for free rotation with respect to said follow-up container means, angle pick-off means responsive to the difference between the azimuth position of said follow-up container means and said sighting means, and
   numerical display means responsive to said angle pick-off means.

2. Apparatus as described in claim 1 wherein:
   said liquid normally has a free surface below the upper portion of said floated gyroscope assembly means for affording pendulous neutral buoyant support thereof in substantially constant vertical relation with respect to said follow-up container means,
   said upper portion of said floated gyroscopic assembly means is equipped with a shallow symmetric convex top having a slope such that liquid normally flows off of said top, and
   said free surface normally resides below the level of said conical top.

3. Apparatus as described in claim 2 wherein said floated gyroscopic assembly means has a cylindrical outer surface disposed in substantially concentric proximate relation to a cylindrical inner surface of said follow-up container means for forming a narrow first annular gap therebetween for accommodating a minor portion of said liquid.

4. Apparatus as described in claim 3 further including a second annular gap encompassing the region of said free surface for reducing adverse torques in said floated gyroscopic assembly means caused by liquid surface tension effects, said second annular gap lying in concentric connected relation above said narrow first annular gap, said second annular gap being wider than said first narrow annular gap.

5. Apparatus as described in claim 3 wherein, below said narrow first annular gap, a major portion of said liquid is accommodated between shaped wall surfaces respectively extending from said outer and inner surfaces for providing a substantial reservoir of said liquid whereby said floated gyroscopic assembly means is supported in substantially constant vertical relation with respect to said follow up container over a substantial temperature range.

6. Apparatus as described in claim 1 wherein said follow-up container means is suspended by shaft means journaled with respect to said external casing means.

7. Apparatus as described in claim 6 wherein,
   said angle pick-off means includes first and second relatively rotatable portions,
   said first relatively rotatable portion being affixed to said sighting means for rotation therewith,
   said second relatively rotatable portion being affixed to said shaft means for rotation therewith, and said numerical display means presents the angular relation of said first and second relatively rotatable portions.

8. A gyroscopic compass comprising:
   support means including external casing means,
   follow-up container means within said external casing means journaled for rotation normally about a vertical axis,
   floated gyroscopic assembly means within said follow-up container means buoyantly supported by liquid contained within said follow-up container means,
   gyroscope rotor means journaled about a normally horizontal axis within said floated gyroscopic assembly means,
   angle pick-off means responsive to the difference between the azimuth position of said floated gyroscopic assembly means and said follow-up container means for developing a control signal at output terminals thereof,
   torquer means responsive to said control signal at input terminals thereof for continuously repositioning said floated gyroscopic assembly means to decrease said difference substantially to zero, and
   motive means additionally responsive to the difference between the azimuth position of said floated gyroscopic assembly means and said follow-up container means for driving said follow-up container means toward alignment with said floated gyroscopic assembly means.

9. Apparatus as described in claim 8 additionally including:
   sighting means journaled for free rotation with respect to said follow-up container means, and
   display means responsive to the difference between the azimith position of said follow-up container means and said sighting means for indicating said difference in azimuth position.

10. Apparatus as described in claim 8 additionally including:
    first demodulator means responsive to said angle pick-off means control signal,
    parallel resistor-capacitor shaping network means responsive to said first demodulator means, and
    first modulator means for providing a modulated signal in response to said shaping network means, said torquer means being responsive to said modulated signal.

11. Apparatus as described in claim 10 further including:

first compensating impedance means in shunt across said output terminals of said angle pick off means, and second compensating impedance means in series relation with said first modulator means and said torquer means.

12. Apparatus as described in claim 11 including reference generator means for supplying a reference signal for said first demodulator and first modulator means and for excitation of said angle pick off and torque means.

13. Apparatus as described in claim 10 further including:

integrator means, first switch means having a first input terminal for selectively coupling the output of said signal shaping means to said integrator means, means for resetting said integrator means, second modulator means responsive to said integrator means, and second switch means for selectively coupling the output of said second modulator means to said motive means.

14. Apparatus as described in claim 13 further comprising:

rate signal generator means responsive to said motive means for supplying a rate signal output, summation means having a first input responsive to said integrator means, an output coupled to said second modulator means, and a second input, said rate signal output being coupled to said second input, and function generator means for modifying said rate signal output by a function of local latitude for application to a second input terminal of said first switch means for selective application to said integrator means.

15. Apparatus as described in claim 14 additionally including:

second demodulator means in series relation with said rate signal generator means and said summation means, and reference generator means for supplying a reference signal to said second modulator and second demodulator means and for excitation of said pick-off means, said torquer means, said motive means, and said rate generator means.

16. Apparatus as described in claim 14 further including timer control means adapted, during a first mode of operation of said gyroscopic compass, for actuating said integrator resetting means for a first predetermined time interval.

17. Apparatus as described in claim 15 wherein said timer control means is further adapted, during a second mode of operation of said gyroscopic compass following said first mode, for deactivating said integrator resetting means and for causing said integrator to integrate the output of said signal shaping network means for a second predetermined time interval for developing an integrated output signal.

18. Apparatus as described in claim 17 wherein said timer control means is further adapted, during a third mode of operation of said gyroscopic compass following said second mode, and for a third predetermined time interval, for:

rendering said second switch means conductive for coupling said integrated output signal for driving said motive means, and operating said first switch means for coupling only said second terminal of said first switch means for supply of the output of said function generator means to said integrator means.

19. Apparatus as described in claim 18 wherein said timer control means is further adapted to cause said gyroscopic compass to repeat at least once said first, second, and third modes of operation in fourth, fifth, and sixth predetermined periods of time succeeding said third predetermined period of time.

20. In a gyroscopic compass:

support means, follow-up container means journaled for rotation about a normally vertical axis with respect to said support means, pendulous floated gyroscopic assembly means buoyantly supported by liquid within said follow-up container means, gyroscopic rotor means journaled about a normally horizontal axis within said pendulous floated gyroscopic assembly means, first vane means disposed symmetrically on said pendulous floated gyroscopic assembly means and having first respective opposed electrically conductive surface means at a first part thereof.

a first pair of inductor means pending within said follow-up container means at said first part, means for supplying an alternating electric current to said inductor means, said inductor means forming a first pair of opposed gaps for generating eddy current flow within said respective opposed electrically conducting surface means at said first part when excited by an alternating electric current, thereby generating when said gaps are unequal, a differential restoring force tending to equalize said first pair of opposed gaps.

21. As apparatus as described in claim 20 further including:

second respective opposed electrically conductive surface means at a second part of said first vane means, and a second pair of inductor means pending within said follow-up container means at second part, means for supplying an alternating electric current to said inductor means, said inductor means forming a second pair of opposed gaps for generating eddy current flow within said respective opposed electrically conductive surface means at said second part when excited by an alternating electric current for tending to equalize said second pair of opposed gaps.

22. Apparatus as described in claim 21 further including:

second vane means disposed symmetrically at substantial right angles to said first vane means on said pendulous floated gyroscopic assembly means, third and fourth spaced pairs of inductor means pending within said follow-up container means, and means for supplying an alternating electric current to said inductor means, said inductor means forming respective third and fourth pairs of gaps with respect to said second vane means for generating eddy current flow at electrically conductive surfaces of said second vane means when excited by an alternating electric current for tending to center said second vane means whereby said first and second vane means and said first, second, third, and fourth pairs of inductor means cooperate in the rotational and translational centering of said pendulous floated gyroscopic assembly means within said follow-up container means.

23. Apparatus as described in claim 20 wherein:
said means for supplying alternating current comprises signal generator means for exciting said first pair of inductor means in parallel relation whereby the respective inductances thereof change differentially in dependence on the direction of rotational departure of said first vane means with respect to said first pair of inductor means, and further including first series connected sensor means responsive to said differential inductance change for generating a first reversible phase alternating control signal whose phase is determined by the direction of said rotational departure.

24. Apparatus as described in claim 23 further including motive means for rotating said follow-up container means in response to said first reversible phase alternating control signal.

25. Apparatus as described in claim 23 further including torquer means for reducing the degree of said rotational departure to substantial by zero in response to said reversible phase alternating control signal.

26. Apparatus as described in claim 21 wherein: said means for supplying
alternating current comprises signal generator means for exciting said first pair of inductor means in parallel relation so that the respective inductances thereof change differentially in dependence of the direction of rotational departure of said first vane means with respect to said first pair of inductor means,
said signal generator means additionally exciting said second pair of inductor means in parallel relation so that the respective inductances thereof change differentially in dependence on the direction of rotational departure of said first vane means with respect to said second pair of inductor means,
first series connected sensor means responsive to said differential inductance change of said first pair of inductor means for generating a first reversible phase alternating control signal whose phase is determined by the direction of said rotational departure with respect to said first pair of inductor means,
second series connected sensor means responsive to said differential inductance change of said second pair of inductor means for generating a second reversible phase alternating control signal whose phase is determined by the direction of said rotational departure with respect to said second pair of inductor means,
said first and second series connected sensor means being coupled for generating an enhanced amplitude reversible phase alternating control signal insensitive to pure translation of said vane means.

27. Apparatus as described in claim 26 further including motive means for rotating said follow-up container means in response to said enhanced amplitude reversible phase alternating control signal toward alignment with said gyroscopic assembly means.

28. Apparatus as described in claim 26 further including torquer means for reducing the degree of said rotational departure to substantially zero in response to said enhanced reversible phase alternating control signal.

29. Apparatus as described in claim 20 further including:
pick off means responsive to the relative rotational departure of said follow-up container means from said pendulous floated gyroscopic assembly means for generating a reversible phase alternating control signal whose phase is determined by the direction of said rotational departure,
said means for supplying
alternating current comprising signal generator means for exciting said first pair of inductor means in parallel relation with a constant phase alternating excitation signal,
first series inductor control means responsive to said reversible phase alternating control signal for differentially changing the energy stored in the respective inductances of said first pair of inductor means whereby a differential force is coupled to said first vane means for reducing said rotational departure to substantially zero.

30. Apparatus as described in claim 21 further including:
pick off means responsive to the relative rotational departure of said follow-up container means from said pendulous floated gyroscopic assembly means for generating a reversible phase alternating control signal whose phase is determined by the direction of said rotational departure,
said means for supplying
alternating current comprising signal generator means for exciting said first pair of inductor means in parallel relation and said second pair of inductor means in parallel relation with a constant phase alternating excitation signal,
first series inductive control means responsive to said reversible phase alternating control signal for differentially controlling the energy stored in the inductances of said first pair of inductor means, and
second series inductance control means responsive to said reversible phase alternating control signal for differentially controlling the energy stored in the inductances of said second pair of inductor means,
said first and second series inductive control means coupled to said respective first and second pairs of inductor means whereby a differential force is cooperatively coupled thereby to said first vane means for reducing said rotational departure substantially to zero.

31. Apparatus as described in claim 30 further including motive means for rotating said follow-up container means in response to said reversible phase alternating control signal toward alignment with said gyroscopic assembly means.

32. In a gyroscopic compass:
support means,
follow-up container means journaled for rotation about a normally vertical axis with respect to said support means,
pendulous floated gyroscopic assembly means buoyantly supported by liquid within said follow-up container means,
gyroscopic rotor means journaled about a normally horizontal axis within said pendulous floated gyroscopic assembly means, first and second vane means disposed on said pendulous floated gyroscopic asembly means in generally cruciform relation, each of said vane means having respective opposed generally vertical electrically conductive surfaces, and respective spaced pairs of inductor means pending within said follow-up container means, means for supplying an alternating electric current to said inductor means, said inductor means forming narrow opposed pairs of gaps with respect to said respective opposed generally vertical electrically conductive surfaces and generating eddy current flow thereat when excited by an alternating electric current thereby generating respective differential restoring forces tending to center said first and second electrically conductive vane means between said respective pairs of inductor means whereby said pendulous floated gyroscopic assembly means is maintained centered within said follow-up container means.

* * * * *